March 9, 1965
E. D. TRUEBLOOD
3,172,161
PLASTIC MACHINES
Filed Aug. 20, 1962
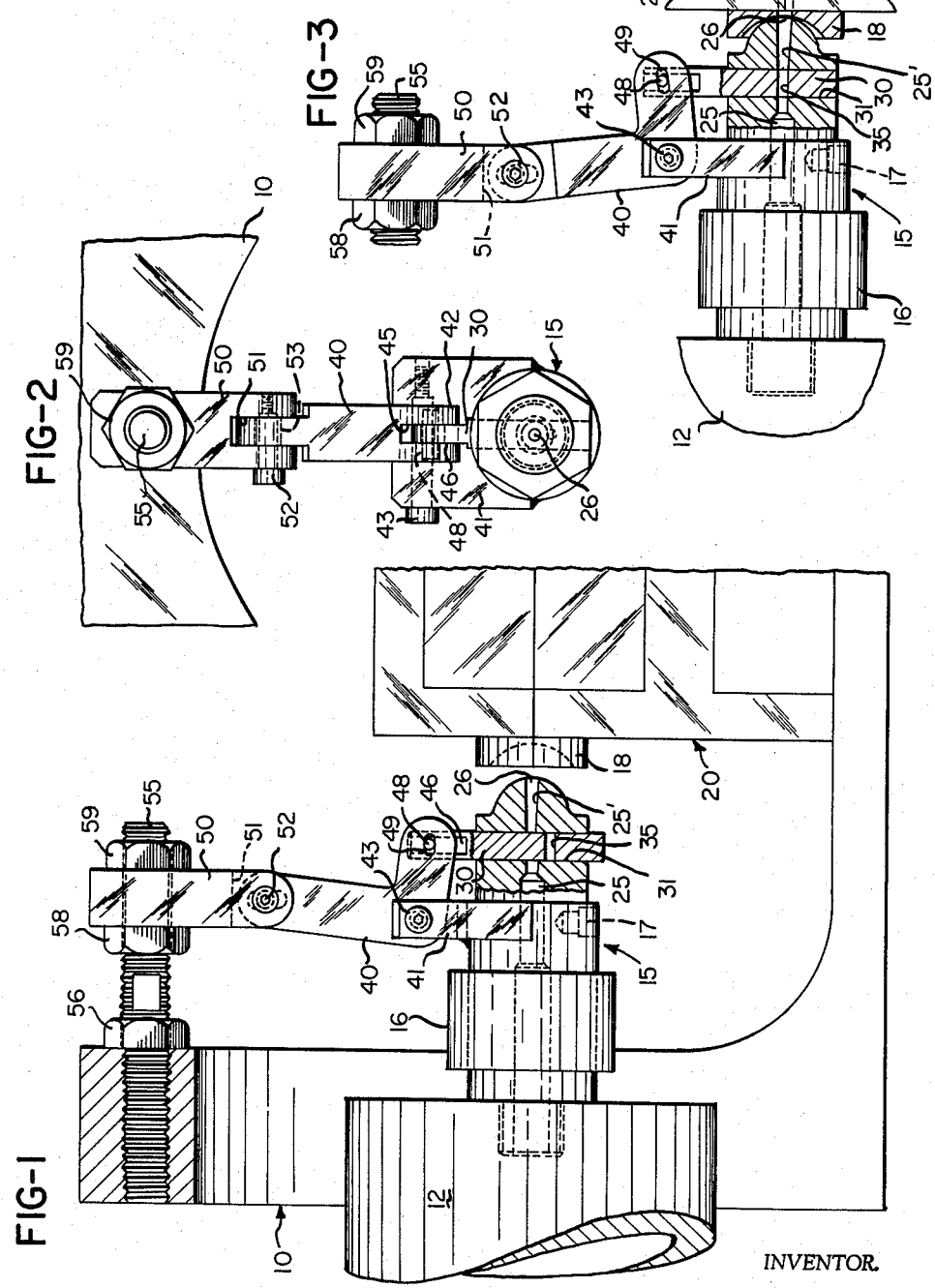
INVENTOR.
ELMER D. TRUEBLOOD
BY
Marechal, Biebel, French & Bugg
ATTORNEYS United States Patent Office 3,172,161
Patented Mar. 9, 1965

3,172,161
PLASTIC MACHINES
Elmer D. Trueblood, Dayton, Ohio, assignor to Trueblood, Inc., Dayton, Ohio, a corporation of Ohio
Filed Aug. 20, 1962, Ser. No. 217,871
4 Claims. (Cl. 18—30)

This invention pertains to plastic machines and more particularly to an injection nozzle with a positive nozzle valve for preventing drooling of the plastic material and for holding the material in readiness for an injection.

Machines for the injection of the plastic material commonly employ a cylinder in which the granulated plastic material is heated and brought to a desired injection temperature. Also, such machines commonly employ an injection nozzle connected to the cylinder. The nozzle may be heated by means of the cylinder heating arrangement or may be separately heated for the purpose of maintaining the plastic in a condition for readiness of injection. It is common practice to mount the cylinder and nozzle assembly upon a suitable carriage or way for guided movement between a normal retracted position and an extended or forward operative position in which the nozzle is placed in contact with cooperating nozzle plates on the cavity mold.

At the beginning of each period of operation, the plastic material within the cylinder and within the nozzle itself is heated until it has reached the desired temperature, as determined usually by a thermo-couple. During this heating period it is desirable to prevent the plastic material from oozing through the open end or orifice of the nozzle. Such oozed material usually forms an agglomeration at the end of the nozzle which hardens and which must be removed prior to injection. If this cleaning is overlooked, the ball of plastic material which has hardened on the end of the nozzle will be forced by the cylinder against the mold and may damage the mold plate or nozzle. Also, a portion of the hardened plastic may be forced into the sprue runner and may freeze or otherwise block the injection passageways.

The problem of drooling at the nozzle is particularly acute when injecting with plastics which are highly viscous, such as nylon, acetate, butyrate and similar plastics. Attempts have been made to eliminate drooling and seeping by the use of ball check valves incorporated within the nozzle. These devices have not been generally satisfactory since they do not have a positive shut-off, but depend mainly upon the release of pressure for the ball valve to close. If the ball is biased by a strong spring to provide a more positive operation, the injection machine then requires proportionately higher injection pressures merely to overcome the closing force of the spring.

This invention provides a nozzle including a positive control valve which is mechanically operated to close the nozzle passageway with the retraction of the cylinder, and positively operates to open the nozzle by the movement of the cylinder into the ejecting position. The valve of this invention is not dependent or otherwise inter-related with the extruding pressure, but is independent of pressure. It prevents the loss of plastic from the nozzle and maintains the nozzle and the plastic in the nozzle in a state of readiness for injection. Preferably, the valve operating arrangement includes an adjustable connection to a fixed portion of the frame of the machine providing for correlation of the operation of the nozzle valve with the reciprocable movement of the plastic cylinder.

An important object of this invention is the provision of an injection molding machine as outlined above including a positively operated mechanical nozzle valve assembly for the prevention of drooling at the nozzle between injections.

Another object of this invention is the provision of a nozzle including a valve which is mechanically operated by the movement of the plastic cylinder.

A further object of this invention is the provision of an automatic nozzle control which prevents the drooling and seeping between injections of nylon or similarly viscous plastics.

A still further object of this invention is the provision of a mechanical nozzle control valve which is operated by an adjustable connection to a fixed part of the machine for positively cutting off flow through the nozzle between injections to hold the plastic therein in a state of readiness for the next injection.

Other objects and advantages of the invention will be apparent from the following description, the accompanying drawings and the appended claims.

In the drawings—

FIG. 1 is a partially broken away elevational view of a plastic injection machine including a nozzle and control valve constructed according to this invention;

FIG. 2 is an end view of the nozzle and valve assembly of FIG. 1; and

FIG. 3 is a fragmentary view of a portion of FIG. 1 showing the moved position of the parts.

Referring to the figures of the drawing which illustrate a preferred embodiment of this invention, a plastic injection machine is shown as including a frame 10 upon which a plasticizing cylinder 12 is mounted. The cylinder 12 is preferably supported on the frame 10 by a suitable guide means (not shown) providing for a limited reciprocable movement between a retracted position, as shown in FIG. 1, to an injecting position, shown in FIG. 3. The cylinder 12 is normally brought forward by hydraulic force in response to the forward movement of the injecting piston, and may be retracted by hydraulic action or by spring connecting the cylinder 12 to the frame 10. Cylinder mounting arrangements for this purpose are well known in the art, and provide for the retraction of the injecting nozzle away from the mold to facilitate the loading and the unloading of the mold, or the shifting of the mold on a table. Such cylinder mounting arrangements form no part of this invention.

The cylinder 12 is provided with an injection nozzle 15, screwed into the forward end of the nozzle 12 may be heated by a band heater 16. A tapped opening at 17 is provided for a thermo-couple.

The nozzle cooperates with a nozzle plate 18 on an injection mold which is somewhat diagrammatically illustrated at 20. The mold 20 may be supported on a bed of the machine or on a shifting table, and operated by a vertical mold closing arrangment, not shown. However, the invention is not limited to the particular type of mold or mold supporting means, and may be readily applied to injection apparatus wherein the mold halves are closed horizontally, for instance.

The nozzle 15 of this invention is formed with an axially aligned injection passageway 25 drilled therein terminating in an injecting orifice 26. The passageway 25 may be of uniform cross section throughout its length or may be tapered at the forward end portions 25' according to the type of material to be run. Preferably, a reverse taper, as indicated at 25', is employed with free flowing or highly viscous plastics, such as nylon. It has been found that a reverse taper, such as of seven degrees included angle, resulting in an enlarged orifice diameter at 26 provides cleaner breaks or shut-offs at the orifice 15 when the cylinder 12 is retracted and reduces the tendency of the slug within the orifice 26 to be pulled out and retained with the mold. This is believed to be due, at least in part, to the increase in mass of the plastic at the orifice 26 which chills at the periphery of the orifice but retains heat at the center, thereby tending to retain the slug in the nozzle 15.

A mechanically operated nozzle valve within the nozzle 25 includes a valve pin 30 which is reciprocably received within a transverse bore 31 extending through the nozzle 15 in intersecting relation to the passageway 25. Preferably, the bore 31 is normal to the passageway 25 and intersects this passageway at right angles, but it is within the scope of this invention to provide a passageway 31 for the pin 30 which intersects the passageway 25 at an incline.

The pin 30 is provided with a drilled passage 35 of substantially the same diameter as the smallest diameter of passageway 25. The passage 30 is preferably of uniform dimension throughout its length, but it is within the scope of this invention to provide it with a taper which coincides with the taper 25'. The pin 30 is preferably formed of hardened stainless steel which has been precision ground to form a sealing fit within the passageway 31, and yet move freely therein.

The passage 35 is alignable with the passageway 25 in the raised or moved position of the pin 30 to provide for the flow of plastic material through the nozzle. When the pin 30 is in its lowered position, as shown in FIG. 1, the passageway 25 is blocked. In the raised position of the pin 30, the heated plastic material may flow freely through the nozzle 15 from the cylinder 12 into the mold 20. The valve parts must be held and machined to close tolerance so as not to have unnecessary free play or movement, to assure proper alignment and seal.

Operating means for the pin 30 includes a generally L-shaped toggle or operating lever 40 which is pivotally mounted on the nozzle 15. The nozzle 15 is provided with an upright flange 41 partially encircling the body of the nozzle and welded thereto. The flange 41 is formed with a U-shaped notch 42 (FIG. 2) within which the toggle 40 is pivoted for rocking movement on a shouldered screw 43. The screw 43 extends through the opening or notch 42 and through a suitable opening formed in the toggle.

The forward end of the toggle 40 is bifurcated or slotted as indicated at 45 (FIG. 2) and forms a pivotal connection to the upper extended portion of the pin 30 at opposite flats 46 formed on the pin and proportioned to be received within the slot 45. A short transverse pin 48 is carried on the upper end of the valve pin 30 and is extended into engagement with the toggle 40 within a slotted toggle opening 49, as shown in FIG. 1, and translates the rocking movement of the toggle 40 on the screw 43 to vertical linear opening and closing movement of the pin 30.

The upper end of the toggle 40 is formed of reduced thickness and is pivotally mounted on a toggle drive arm 50 within a slotted opening 51 formed therein, on a shouldered pivot bolt 52. The upper end of the toggle 40 is provided with a slotted or enlarged opening 53 at the bolt 52 providing sliding movement as the toggle pivots on the nozzle 15.

The arm 50 is mounted on the frame 10 by means of a forwardly extending adjusting rod 55 which is threaded into the frame 10 and secured by a nut 56. The arm 50 is provided with a suitable opening for sliding adjusting movement over the rod 55 and is held thereon in an axially adjusted position by a pair of opposite locking nuts 58 and 59. The nuts 58 and 59 provide the means for adjusting the arm 50 in a position which is correlated with the closed or forward position of the cylinder 12 at the end of its stroke to effect alignment of the passage 35 and the passageway 25 precisely at the point where the nozzle 15 contacts the nozzle plate 18.

In the operation of this invention, plastic within the cylinder 12 and within the nozzle 15 is brought up to injecting temperatures by suitable heater means on the cylinder 12 and by the band heater 16 on the nozzle 15. When the machine has come up to operating temperature, the operator initiates a cycle of injection which brings the cylinder 12 forwardly until the end of the nozzle 15 has closed with the nozzle plate 18. The forward movement of the cylinder 12, which may be effected by the injection ram, results in the lifting of the pin 30 through rotation of the toggle 40 on the bolt 43 aligning the passage 35 with the passageway 25, providing for the unrestricted flow of plastic material through the nozzle 15. Initially, it may be desirable to adjust the position of the arm 50 on the adjusting rod 55 to assure the precise alignment of the passage 35 with any particular set up, as shown in FIG. 3. Therefore, the pin 30 is preferably ground flush with the bottom of the nozzle with the passage 35 so aligned to provide a means of indicating this condition of coincidence.

At the conclusion of the injection, the nozzle 15 is retracted from the nozzle plate 18 by the withdrawal of the cylinder 12. The nozzle 15 will break away clean at the nozzle plate 18 by the fracture of the plastic at the orifice 26. The initial retracting movement of the cylinder 12 results in the displacement of the pin 30 downwardly to its normal position, thereby blocking the passageway 25 and preventing the oozing or drooling of plastic material through the orifice 26. The plastic material within the passageway 25 and the pin passage 30 and a major portion of the taper 25' will remain in a plastic state between injections by reason of the heater band 16 so that the nozzle 15 is retained in a state of readiness for the next injection. If a small portion of the plastic material at the orifice 26 becomes hardened due to chilling at the orifice, it is readily remixed with hot plastic during the next injection and does not form an objectionable slug of cold plastic material.

It is therefore seen that this invention provides a plastic injection control valve which operates in positive synchronism with the injecting cycle. It creates no back pressure of its own in the open position and forms a positive seal in the closed position. It retains the nozzle in a state of readiness between injections and prevents the accumulation of a bead or external formation of chilled plastic around the orifice, thereby increasing the rate at which the machine may be operated by eliminating the necessity for periodically cleaning the external parts of the nozzle. The valve nozzle of this invention contains no pressure operated parts which could clog or become frozen in position to impede or reduce the effectiveness of the valve.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a plastic injection machine having an injection cylinder mounted on the machine frame for the movement of an injection nozzle into closing contact with a nozzle plate on a mold and for withdrawal therefrom subsequent to injection, the improvement comprising a longitudinally extending passageway in said nozzle terminating in an injection orifice, means in said nozzle defining a transverse bore in intersecting relation to said passageway adjacent said orifice, a pin reciprocably received in said bore and defining a passage therethrough alignable with said nozzle passageway in a first position thereof providing plastic flow therethrough and blocking said passageway in a second position, a pin operating toggle pivotally mounted on said nozzle for rocking movement, means connecting one end of said toggle to said pin to effect reciprocating flow controlling movement thereof with rocking movement of said toggle, and means on said frame pivotally securing another end of said toggle for effecting said rocking movement thereof in synchronism with reciprocating movement of said plastic cylinder free of any operative connection with said mold for moving of said pin from said second to said first position with said closing contact with said nozzle plate.

2. In a plastic injection machine of claim 1 wherein the portion of said passageway between said bore and said orifice defines a reverse taper with the passageway at said orifice being larger than at said base.

3. In a plastic injection machine having an injection cylinder mounted on the machine frame for the movement of an injection nozzle into closing contact with a nozzle plate on a mold and for withdrawal therefrom subsequent to injection, the improvement comprising a longitudinally extending passageway in said nozzle terminating in an injection orifice, means in said nozzle defining a transverse bore of uniform diameter throughout its length in normal intersecting relation to said passageway adjacent said orifice, a pin reciprocably received in said bore and defining a passage therethrough alignable with said nozzle passageway in one position thereof providing plastic flow therethrough and blocking said passageway in another position, a pin operating toggle pivotally mounted on said nozzle for rocking movement, means connecting one end of said toggle to said pin to effect reciprocating movement thereof between said first and second positions with rocking movement of said toggle, and means on said frame pivotally securing another end of said toggle for effecting said rocking movement thereof with reciprocating movement of said plastic cylinder, and being adjustable relative to said frame to provide alignment of said passage with said bore in said one position at the point in the movement of said cylinder at which said nozzle contacts said nozzle plate.

4. In a plastic injection machine having an injection cylinder movably mounted on the machine frame for the movement of an injection nozzle into closing contact with a nozzle plate on a mold for injection of plastic into the mold and for withdrawal therefrom after injection, the improvement comprising a longitudinally extending passageway in said nozzle terminating in an injection orifice, means in said nozzle defining a transverse bore in intersecting relation to said passageway, a pin reciprocably received in said bore and defining a passage therethrough alignable with said passageway in one position thereof providing for injection flow therethrough and blocking said passageway in another position, a pin operating generally L-shaped toggle pivotally mounted on said nozzle for rocking movement thereon, said toggle having a forward end pivotally connected to said pin to effect said reciprocating flow controlling movement thereof and an upper end, a forwardly extending member fixedly mounted on said frame, a depending arm axially positionable on said member and having a pivotal connection with said upper end of said toggle anchoring said upper end in relation to said frame to effect said rocking movement thereof with reciprocal movement of said cylinder for moving said pin to said one position with movement of said nozzle into mold contacting position and returning said pin to said other position with withdrawal of said nozzle from said mold.

References Cited by the Examiner
FOREIGN PATENTS
467,753 10/28 Germany.
791,557 3/58 Great Britain.

WILLIAM J. STEPHENSON, *Primary Examiner.*

MICHAEL V. BRINDISI, *Examiner.*